US012705344B2

(12) United States Patent
Khati et al.

(10) Patent No.: US 12,705,344 B2
(45) Date of Patent: Aug. 11, 2026

(54) SECURITY ASSOCIATION LOOKUP IN COMMUNICATION SYSTEM DEPLOYMENTS

(71) Applicant: Nokia Solutions and Networks Oy, Espoo (FI)

(72) Inventors: Digvijay Khati, Fremont, CA (US); Keshavamurthi Jayanthi Murugesan, Tracy, CA (US); Rahul Singal, Cupertino, CA (US); Lokheshvar Balakumar, Apex, NC (US)

(73) Assignee: Nokia Solutions and Networks Oy, Espoo (FI)

(*) Notice: Subject to any disclaimer, the term of this patent is extended or adjusted under 35 U.S.C. 154(b) by 52 days.

(21) Appl. No.: 18/655,670

(22) Filed: May 6, 2024

(65) Prior Publication Data

US 2025/0342244 A1 Nov. 6, 2025

(51) Int. Cl.
*G06F 21/55* (2013.01)
*H04L 45/74* (2022.01)

(52) U.S. Cl.
CPC ............ *G06F 21/554* (2013.01); *H04L 45/74* (2013.01); *G06F 2221/034* (2013.01)

(58) Field of Classification Search
None
See application file for complete search history.

(56) References Cited

U.S. PATENT DOCUMENTS 11,665,131 B1 * 5/2023 Subramanian ...... H04L 61/2517 709/245
12,432,184 B2 * 9/2025 Solanki .............. H04L 63/0428
2015/0121076 A1 4/2015 Wante
2018/0262468 A1 * 9/2018 Kumar .................. H04L 69/161
2021/0400029 A1 12/2021 Wang et al.
2023/0231826 A1 * 7/2023 Pawar .................. H04L 61/251 709/226
2023/0350736 A1 11/2023 Agarwal et al.

OTHER PUBLICATIONS

Silver Peak, "IPsec UDP Mode in Silver Peak Unity EdgeConnect." Whitepaper, Document Code SP-WP-IPSEC-UDP-102218 (2018): 1-12.

Kent, Stephen. "IP Encapsulating Security Payload (ESP)." RFC4303, Internet Engineering Task Force. (Dec. 2005): 1-44.

* cited by examiner

*Primary Examiner* — Atta Khan

(74) *Attorney, Agent, or Firm* — Mendelsohn Dunleavy, P.C.; Steve Mendelsohn

(57) ABSTRACT

To generate an encrypted packet, a transmitting endpoint in a communication system chooses the desired IPsec tunnel, then retrieves the SA linked to that tunnel from its Outbound SA table of its local SA database (SAD), and encrypts the packet using the retrieved SA. To decrypt the encrypted packet, the receiving endpoint extracts the Security Parameter Index (SPI) value, the source address, the destination address, and the source port number from the packet to retrieve the appropriate SA from its local SAD database and decrypts the encrypted packet using the retrieved SA. In this way, the transmitting and receiving endpoints can retrieve the appropriate SAs for situations in which either endpoint is one of multiple endpoints located behind a Carrier-Grade Network Address Translation (CG-NAT) function having a single public IP address shared by the multiple endpoints.

12 Claims, 4 Drawing Sheets

100
102(3)
IOT DEVICE
192.0.24.10
102(4)
IOT DEVICE
192.0.25.10
102(5)
IOT DEVICE
192.0.26.10
102(6)
IOT DEVICE
192.0.27.10
112
CPE ROUTER
104
CONTROLLERS
PC
114(1)
PC
IPsec ENDPOINT
192.0.28.10
102(7)
PC
114(2)
PC
IPsec ENDPOINT
192.0.29.10
102(8)
PC
TABLET
PC
IPsec ENDPOINT
192.0.30.10
102(9)
108
ROUTER CG-NAT
130.104.4.1
106
INTERNET
10.15.33.254
IPsec ENDPOINT
102(1)
116
HEAD OFFICE
CG NAT TRANSLATION
192.0.28.10:4500 – 130.104.4.1:12323
192.0.29.10:4500 – 130.104.4.1:1036
192.0.30.10:4500 – 130.104.4.1:3056
110
130.104.10.1
ROUTER 1:1–NAT
NAT TRANSLATION
192.0.9.10:ANY – 130.104.10.1:ANY
192.0.9.10
102(2)
IPsec ENDPOINT
DATACENTER

Figure 3:
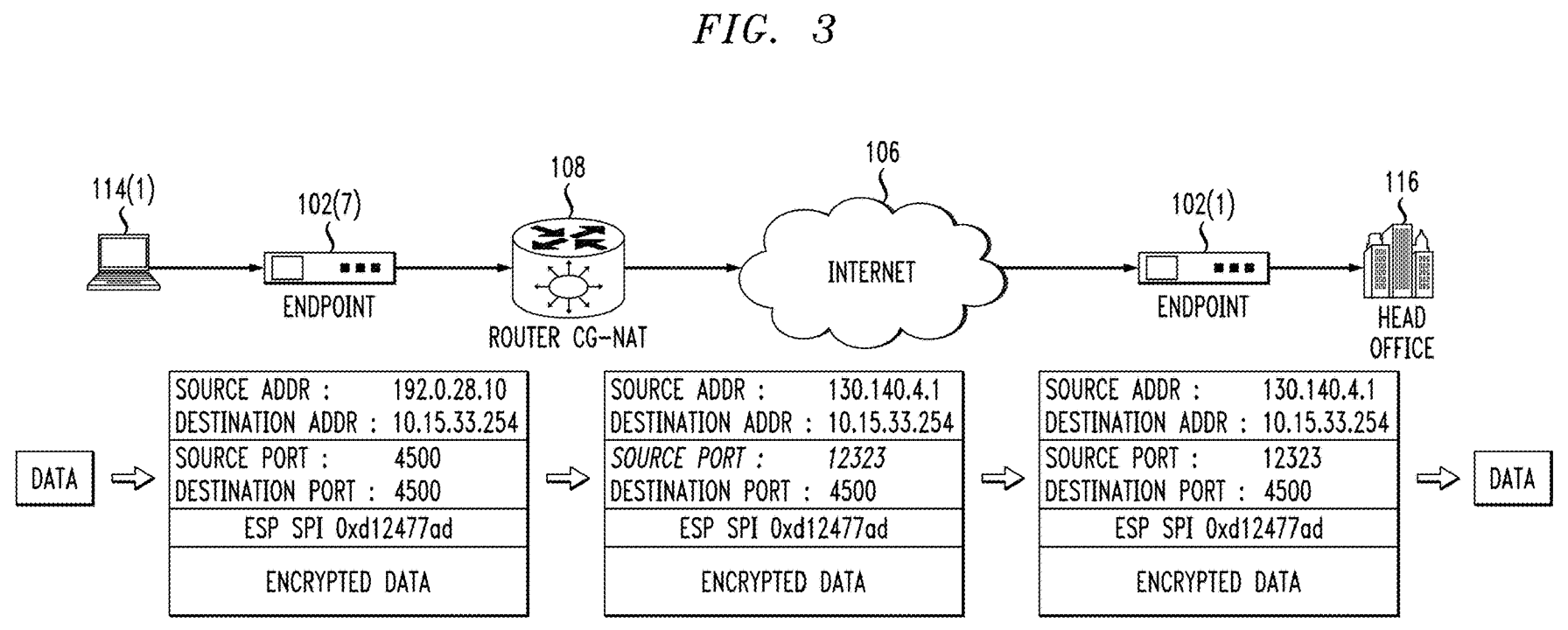

102(7) ENDPOINT

108 ROUTER CG–NAT

106 INTERNET

102(1) ENDPOINT

116 HEAD OFFICE

DATA

SOURCE ADDR : 192.0.28.10
DESTINATION ADDR : 10.15.33.254
SOURCE PORT : 4500
DESTINATION PORT : 4500
ESP SPI 0xd12477ad
ENCRYPTED DATA

SOURCE ADDR : 130.140.4.1
DESTINATION ADDR : 10.15.33.254
*SOURCE PORT : 12323*
DESTINATION PORT : 4500
ESP SPI 0xd12477ad
ENCRYPTED DATA

SOURCE ADDR : 130.140.4.1
DESTINATION ADDR : 10.15.33.254
SOURCE PORT : 12323
DESTINATION PORT : 4500
ESP SPI 0xd12477ad
ENCRYPTED DATA

DATA

500

TRX 502

PROC 504

MEM 506

SECURITY ASSOCIATION LOOKUP IN COMMUNICATION SYSTEM DEPLOYMENTS

BACKGROUND

Field of the Disclosure

The present disclosure relates to communication systems and, more specifically but not exclusively, to providing secure communications in communication systems.

Description of the Related Art

This section introduces aspects that may help facilitate a better understanding of the disclosure. Accordingly, the statements of this section are to be read in this light and are not to be understood as admissions about what is prior art or what is not prior art.

In a communication system, such as a software-defined wide-area network (SD-WAN) enterprise, having multiple SD-WAN endpoints, each endpoint is positioned at the customer edge facing a communication network, such as the Internet, with a fully meshed connectivity. Within these systems, all endpoints function as peers, securely exchanging client's access information through Internet Protocol Security (IPsec) tunnels. Information exchanged through IPsec tunnels is cryptographically encrypted and authenticated. For this encryption and authentication to occur, both local and remote endpoints need to mutually agree upon common keying materials and establish a common Security Association (SA). Each SA includes encryption keys, encryption algorithms, authentication keys, authentication algorithms, and pseudo-random functions, etc. The dynamic exchange of keying materials between the endpoints for generating the SAs using Internet Key Exchange version 2 (IKEv2) can be a resource-intensive approach especially in full mesh deployments. Instead, Group Domain of Interpretation (GDOI) (as represented in FIG. 1 described below) may be efficient for global encryption key management.

In the GDOI design, a centralized system controller is responsible for generating and distributing the keying materials, ensuring that all system endpoints possess consistent access to the keying materials. Later, the endpoints locally generate and maintain the SAs needed for encrypting and decrypting their communications.

When the system endpoints are powered-on, as part of the bootstrapping procedure, they establish control plane connection (using protocols like OpenFlow, DTLS, etc.) with the system controller. Some or all of these endpoints may be deployed behind a Network Address Translation (NAT) node. The system controller learns the endpoint's information and its NAT-translated addresses and ports from the control channel's message exchanges. Later, the system controller distributes this critical information (like keying materials needed for generating the SAs and peer endpoint's private/public Internet Protocol (IP) address and port, etc.). The system controller later distributes this endpoint's private/public Internet Protocol (IP) address and port to all other endpoints.

Having this controller-provided information, the endpoints operate autonomously to create static IPsec tunnels within their local environments towards all the learned peer IP addresses and ports. These tunnels are established along with their associated Security Associations (SAs). The SA information is generated and stored locally by the endpoint in their security association database (SAD). Each SA contains crucial parameters such as the Security Parameter Index (SPI), Source IP, Destination IP, Source Port, Destination Port, Encryption keys, Encryption Algorithms, Authentication keys, Authentication Algorithms, replay window etc. The SPI is an index for the SAs in the SAD database that is generated by the endpoint locally.

Each IPsec tunnel is linked to two SAs (in the SAD database) for each pair of endpoints that can support secure communications through the network: a first SA for encrypting outgoing packets at the first endpoint and decrypting incoming packets at the second endpoint and a second SA for encrypting outgoing packets at the second endpoint and decrypting incoming packets at the first endpoint. Thus, the SAD database at the first endpoint has the first SA for encrypting outgoing packets to be transmitted to the second endpoint and the second SA for decrypting incoming packets received from the second endpoint. Similarly, the SAD database at the second endpoint has the second SA for encrypting outgoing packets to be transmitted to the first endpoint and the first SA for decrypting incoming packets received from the first endpoint. The first SA is stored in the Outbound SA table at the first endpoint and in the Inbound SA table at the second endpoint. The second SA is stored in the Outbound SA table at the second endpoint and in the Inbound SA table at the first endpoint.

When the first endpoint communicates with the second endpoint, the first endpoint selects the IPsec tunnel and the referenced first SA from the Outbound SA table for encrypting the outgoing packets to the second endpoint. The first endpoint also includes the first SA's SPI index value in the ESP header of the encrypted packet. The second endpoint, on receiving the encrypted packet, uses the SPI along with other information to identify the same first SA from its Inbound SA table to decrypt the packet. Similarly, when the second endpoint wants to send traffic to the first endpoint, the second endpoint selects the IPsec tunnel towards the first endpoint and encrypts the packet using the second SA from its Outbound SA table and includes the second SA's SPI Index in the ESP header and transmits the packet towards first endpoint. The first endpoint uses the SPI and other information from the encrypted packets to correctly identify the second SA in its Inbound SA table and decrypt the packet.

Encrypted packets are transmitted through an IPsec tunnel to facilitate the secure exchange of information between the access clients behind the endpoints. It is known for a receiving endpoint to (i) extract information, e.g., SPI, source IP address (of the transmitting endpoint), and destination IP address (of the receiving endpoint), from each received, encrypted packet, (ii) use that extracted information to access the receiving endpoint's local SAD database to identify and retrieve the corresponding SA, and (iii) use the retrieved SA information to decrypt the encrypted packet.

SUMMARY

The IPsec endpoints in a network with GDOI implementation are generally deployed behind a NAT. The NAT's function involves translating private IP addresses to public IP addresses for routing internal hosts to external hosts. Based on the network topology, different types of NAT functions are implemented. There are scenarios where multiple endpoints are deployed behind a single Carrier Grade NAT (CG-NAT) function, where the multiple endpoints share a single, common public IP address that is known to the intervening network, e.g., the Internet, but have different private IP addresses that are not known to the Internet. To accomplish this, the CG-NAT function acts as an agent between the Internet and the local private network servicing multiple endpoints. With this CG-NAT function, one public IP address can represent hundreds or even thousands of endpoints within the private network.

As defined by the Internet Engineering Task Force (IETF) RFC 4303 "IP Encapsulating Security Payload (ESP)", the teachings of which are incorporated herein by reference in their entirety, to decrypt received encrypted packets, endpoints perform SA lookups using the SPI value, the destination IP address, and the source IP address extracted from received, encrypted packets.

Consider local endpoints EP1, EP2, and EP3 located behind a CG-NAT function, with EP4 being a remote endpoint. All these endpoints are centrally managed by the same system controller. As part of the CG-NAT function, the private addresses of the endpoints EP1, EP2 and EP3 are translated into the same public IP address but with different port numbers. All these endpoints connect with the controller to receive the necessary keying materials and peer endpoint information. Using this information, the endpoints locally create IPsec tunnels towards peer endpoints, compute the associated Inbound and Outbound SAs, and store them in local SAD database. It is possible that the Inbound SA SPIs generated locally by EP4 for EP1 and EP2 will be identical. In such instances, the SAs at EP4 for EP1 and EP2 will share the same SPI value, the same source IP address (EP1 and EP2 will have the same CG-NAT'ed public IP address), and the same destination IP address (EP4's IP address). As such, this scenario can lead to EP4 selecting the wrong SA to decrypt received encrypted packets, causing a loss of IPsec traffic. The traffic loss could be due to replay check failure or different underlings' SA parameters.

According to certain embodiments, in addition to extracting the SPI value, the source IP address, and the destination IP address from a received, encrypted packet, a receiving endpoint also extracts the source port number from the encrypted packet and uses all four values to access the SAD database to identify the SA used to decrypt the encrypted packet. For the previous example, in addition to the same SPI value, the same source IP address, and the same destination IP address, for an encrypted packet received from EP1, EP4 will use the extracted source port number to access the SAD database to identify the corresponding SA used by EP1, and, for an encrypted packet received from EP2, EP4 will use the extracted source port number from the encrypted packet to access the SAD database to identify the corresponding SA used by EP2. By including the source port number, the receiving endpoint can avoid collisions between SAs having the same SPI value, the same source IP address, and the same destination IP address in the endpoint's SAD database for systems that support CG-NAT functions.

BRIEF DESCRIPTION OF THE DRAWINGS

Embodiments of the disclosure will become more fully apparent from the following detailed description, the appended claims, and the accompanying drawings in which like reference numerals identify similar or identical elements.

FIG. 3 represents the flow of an encrypted packet 200 from PC 114(1) of FIG. 1 to head office 116;

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

Figure 1:
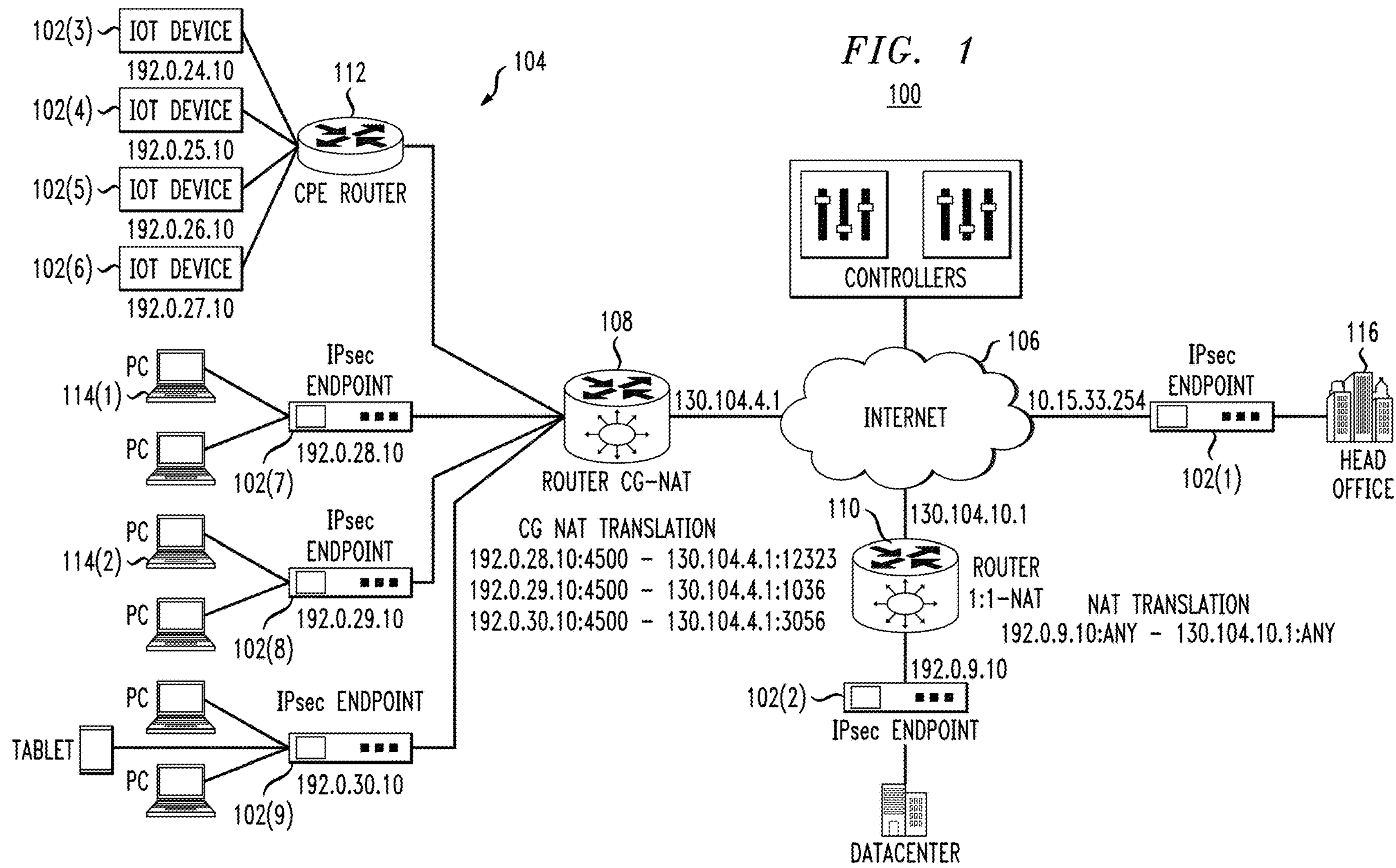
FIG. 1 is a block diagram of a GDOI communication system according to certain embodiments of the disclosure.

FIG. 1 is a block diagram of a GDOI communication (comm) system 100 according to certain embodiments of the disclosure. As shown in FIG. 1, comm system 100 comprises a variety of different types of endpoints 102(1)-102(9) that can communicate with one another via an intervening network, in this case, the Internet 106, although other implementations may have other suitable types of intervening networks, such as a Multiprotocol Label Switching (MPLS) network, etc. As used herein, the term "endpoint" refers to any edge node that is an aggregator for customer traffic going to/from the intervening network. As shown in FIG. 1, an endpoint can be an Internet of Things (IOT) device as well as an aggregator for one or more other elements, such as (without limitation) personal computers, tablets, data centers, and head offices.

Endpoints 102(3)-102(9) are part of a private network 104 that accesses the Internet 106 via Internet Service Provider (ISP) router 108, which supports CG-NAT functionality. Note that IOT endpoints 102(3)-102(6) communicate with ISP router 108 via Computer Premises Equipment (CPE) router 112.

Comm system 100 supports secure packetized communications between endpoints 102(1), 102(2), and 102(7)-102(9), where each transmitted packet is encrypted using the Internet Protocol Security (IPsec) protocol.

Figure 2:
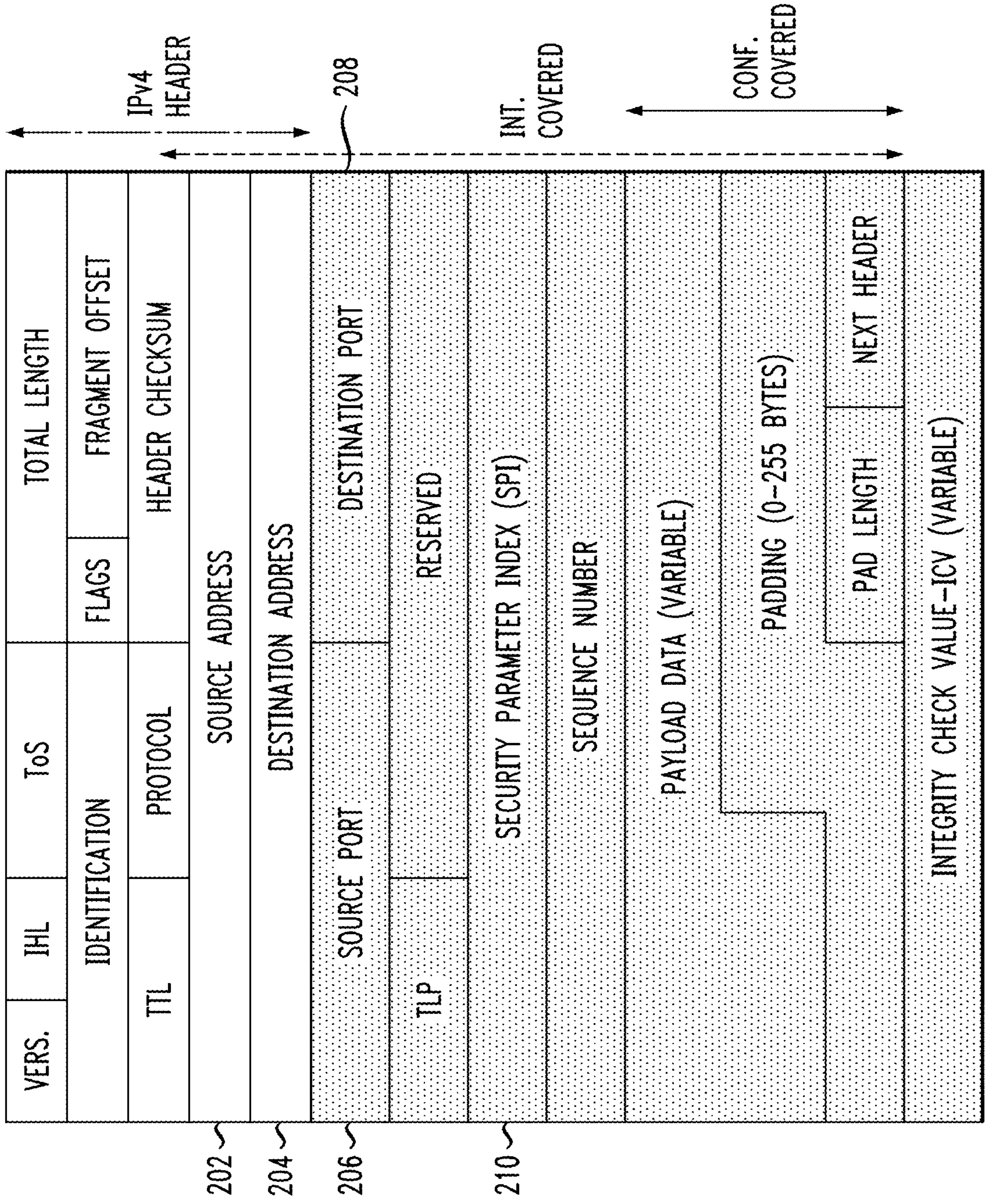
FIG. 2 represents the format of a packet transmitted through the Internet of FIG. 1.

FIG. 2 represents the format of a packet 200 transmitted through the Internet 106. As known in the art, the Internet 106 recognizes IP addresses referred to as public IP addresses. When the packet 200 is routed through the Internet 106 from a transmitting node to a receiving node, the packet 200 contains the public IP address of the transmitting node as the source IP address 202 and the public IP address of the receiving node as the destination IP address 204. It is also known for endpoints 102 to use the same port number (e.g., 4500) for encrypted packets. In particular, when an encrypted packet leaves an endpoint 102, the source port number will be (4500), and, when an encrypted packet arrives at an endpoint 102, the destination port number will be (4500).

In FIG. 1, endpoint 102(1) has only a public IP address of (10.15.33.254).

Endpoint 102(2) has a public IP address of (130.104.10.1) that is known to the Internet 106 and a private IP address of (192.0.9.10) that is not known to the Internet. A 1:1 Network Address Translation (NAT) router 110 performs IP address translations between that endpoint's public and private IP addresses. In particular, when endpoint 102(2) transmits a packet 200 to another endpoint 102, the source address 202 in the packet 200 is the private IP address (192.0.9.10) of endpoint 102(2). When that packet 200 traverses the 1:1 NAT router 110, the source address 202 in the packet 200 is changed to the public IP address (130.104.10.1) of endpoint 102(2). In some embodiments, the 1:1 NAT functionality of router 110 is implemented at the endpoint 102(2), in which case the router 110 may be omitted.

Like endpoint 102(2), each of endpoints 102(3)-102(9) has a unique private IP address that is not known to the Internet. For example, endpoint AD(7) has a private IP address of (192.0.28.10), endpoint AD(8) has a private IP address of (192.0.29.10), and endpoint AD(9) has a private IP address of (192.0.30.10).

Unlike endpoint 102(2), which relies on the 1:1 NAT function 110 to perform IP address translations, endpoints 102(3)-102(9) all rely on a single Carrier Grade NAT (CG-NAT) function at router 108 to perform their IP address translations, where the CG-NAT function 108 has a single, shared public IP address (130.104.4.1) for all of endpoints 102(3)-102(9) and a different port number for each of endpoints 102(3)-102(9). For example, at the CG-NAT function 108, the port number for endpoint 102(7) is (12323), the port number for endpoint 102(8) is (1036), and the port number for endpoint 102(9) is (3056). In order to perform IP address translations for endpoints 102(3)-102(9), the mappings stored in the CG-NAT function 108 include the different port numbers in addition to the IP addresses.

Thus, the NAT mapping in the CG-NAT function AE for the IP address translation for encrypted packets transmitted to and from endpoint 102(7) is (192.0.28.10:4500)⇔(130.104.4.1:12323), where (192.0.28.10) is the private IP address for endpoint 102(7), (4500) is the port number at endpoint 102(7) for encrypted packets, (130.104.4.1) is the public IP address for the CG-NAT function 108, and (12323) is the port number at the CG-NAT function 108 for endpoint 102(7).

Similarly, the NAT mapping in the CG-NAT function 108 for the IP address translation for encrypted packets transmitted to and from endpoint 102(8) is (192.0.29.10:4500)⇔(130.104.4.1:1036), where (192.0.29.10) is the private IP address for endpoint 102(8), (4500) is the port number at endpoint 102(8) for encrypted packets, (130.104.4.1) is the public IP address for the CG-NAT function 108, and (1036) is the port number at the CG-NAT function 108 for endpoint 102(8).

FIG. 3 represents the flow of an encrypted packet 200 from PC 114(1) of FIG. 1 to head office 116. As shown in FIG. 3, the data from PC 114(1) is encrypted and packetized at endpoint 102(7), where, for each encrypted packet 200:

- The source address 202 is the private IP address (192.0.28.10) of endpoint 102(7);
- The destination address 204 is the public IP address (10.15.33.254) of endpoint 102(1);
- The source port number 206 is the port number (4500);
- The destination port number 208 is the port number (4500); and
- The SPI 210 is 0xd12477ad.

As such, the outgoing, encrypted packet 200 is able to traverse the private network 104 from endpoint 102(7) to the CG-NAT function 108.

When that outgoing, encrypted packet 200 traverses the CG-NAT function 108:

- The source address 202 gets translated into the (shared) public IP address (130.104.4.1) of endpoint 102(7); and
- The source port number 206 gets translated into the port number (12323) for endpoint 102(7).

As such, the outgoing, encrypted packet 200 is able to traverse the Internet 106 from the CG-NAT function 108 to the endpoint 102(1).

Although not shown in the figures, when an encrypted packet 200 is transmitted from endpoint 102(1) towards endpoint 102(7):

- The source address 202 is the public IP address (10.15.33.254) of endpoint 102(1);
- The destination address 204 is the public IP address (130.104.4.1) of endpoint 102(7);
- The source port number 206 is the port number (4500); and
- The destination port number 208 is the port number (12323).

As such, the incoming, encrypted packet 200 is able to traverse the Internet 106 to the CG-NAT function 108.

When that incoming, encrypted packet 200 traverses the CG-NAT function 108:

- The destination address 204 gets translated into the private IP address (192.0.28.10) of endpoint 102(7); and
- The destination port number 206 gets translated into the port number (4500).

As such, the incoming, encrypted packet 200 is able to traverse the private network 104 from the CG-NAT function 108 to endpoint 102(7).

Figures 4, 5:
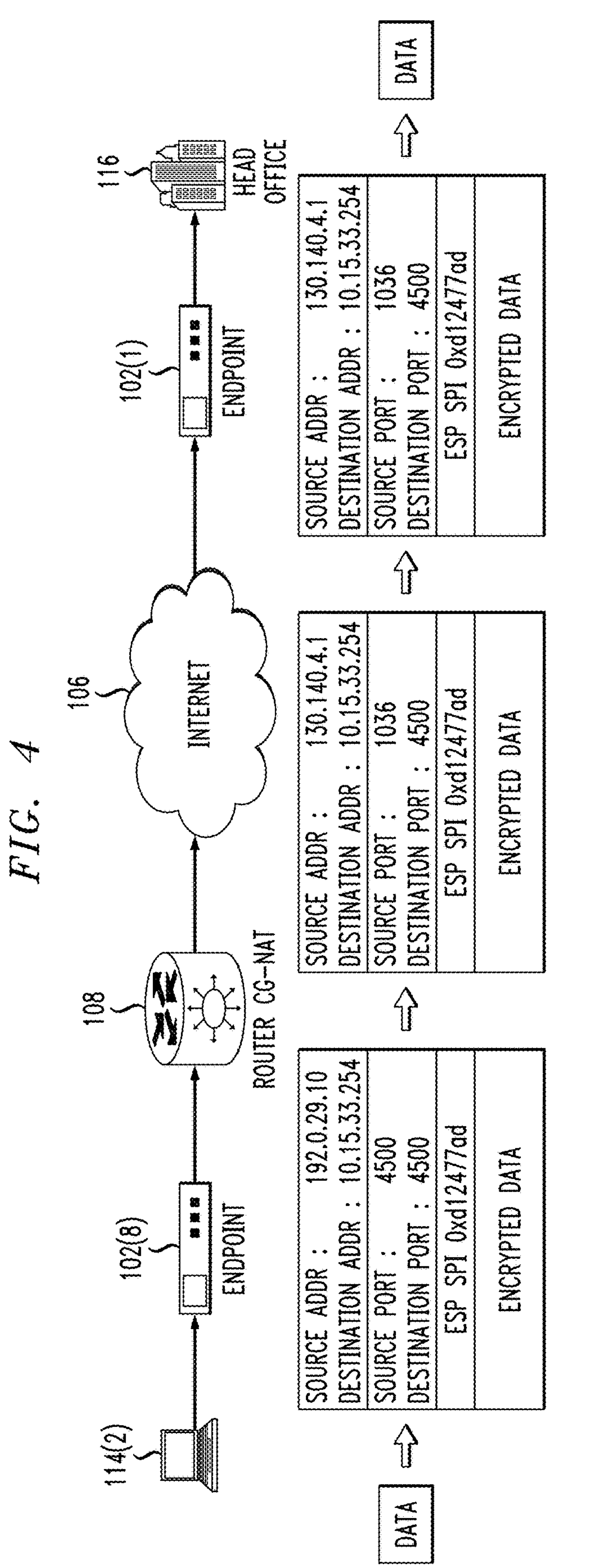
FIG. 4 represents the flow of an encrypted packet 200 from PC 114(2) of FIG. 1 to head office 116.
FIG. 5 is a simplified hardware block diagram of an example endpoint that can be used to implement any of the endpoints of FIG. 1.

FIG. 4 represents the flow of an encrypted packet 200 from PC 114(2) of FIG. 1 to head office 116. As shown in FIG. 4, the data from PC 114(2) is encrypted and packetized at endpoint 102(8), where, for each encrypted packet 200:

- The source address 202 is the private IP address (192.0.29.10) of endpoint 102(8);
- The destination address 204 is the public IP address (10.15.33.254) of endpoint 102(1);
- The source port number 206 is the port number (4500);
- The destination port number 208 is the port number (4500); and
- The SPI 210 is 0xd12477ad.

As such, the outgoing, encrypted packet 200 is able to traverse the private network 104 from endpoint 102(8) to the CG-NAT function 108.

When that outgoing, encrypted packet 200 traverses the CG-NAT function 108:

- The source address 202 gets translated into the (shared) public IP address (130.104.4.1) of endpoint 102(8); and
- The source port number 206 gets translated into the port number (1036) for endpoint 102(8).

As such, the outgoing, encrypted packet 200 is able to traverse the Internet 106 from the CG-NAT function 108 to the endpoint 102(1).

As described previously, each endpoint 102 has a local Security Association (SA) Database (SAD) that contains two corresponding SAs for every IPsec tunnel between each pair of endpoints 102 that support secure connections through the Internet 106, where each SA contains a set of key information needed to encrypt and decrypt packets transmitted between those two endpoints. For example, for encrypted packets transmitted from endpoint 102(1) to endpoint 102 (7), both endpoints 102(1) and 102(7) should have the same SA information in the Outbound and Inbound SA tables, respectively, where endpoint 102(1) uses the SA from its Outbound SA table to generate each encrypted packet and endpoint 102(7) matches the same SA from its Inbound SA table to decrypt that encrypted packet. Furthermore, for encrypted packets transmitted from endpoint 102(7) to endpoint 102(1), both endpoints 102(7) and 102(1) have the same SA information in the Outbound and Inbound SA tables, respectively, where endpoint 102(7) uses that SA from its Outbound SA table to generate each encrypted packet and endpoint 102(1) matches the same SA in its Inbound SA table to decrypt that encrypted packet.

Thus, to generate an encrypted packet, an endpoint 102 retrieves the appropriate SA from its local SAD database and uses the retrieved SA information to encrypt the packet. When an encrypted packet arrives at an endpoint 102, the endpoint 102 extracts certain information from the packet and uses that extracted information to access its local SAD database to retrieve the appropriate SA needed to decrypt the packet.

According to certain embodiments of the disclosure, when generating an encrypted packet to transmit to another endpoint, the transmitting endpoint first chooses the IPsec tunnel based on the routing algorithm implementation. Every IPsec tunnel has an SA index referenced in the Outbound SA table in its local SAD database. Using the Index, the SA is then retrieved from the Outbound SA table to encrypt the packet. To decrypt that encrypted packet, the receiving endpoint extracts, from the packet, the SPI value, the source IP address, the destination IP address, and the source port number, and uses those four values to access its local SAD database to retrieve the appropriate SA needed to decrypt the packet.

For example, when generating an encrypted packet to transmit to endpoint 102(1), endpoint 102(7)'s routing algorithm first selects the IPsec tunnel, identifies the Outbound SA Index associated with that tunnel, and then performs a lookup using the Index in the Outbound SA table to retrieve the appropriate SA to encrypt the packet.

Note that, as shown in FIG. 3, when that encrypted packet traverses the CG-NAT function 108, (i) the packet's the source IP address 202 will be translated from endpoint 102(7)'s private IP address (192.0.28.10) to endpoint 102 (7)'s public IP address (130.104.4.1) and (ii) the packet's source port number 206 will be translated from endpoint 102(7)'s port number (4500) at endpoint 102(7) to endpoint 102(7)'s port number (12323) at the CG-NAT function 108.

In order to decrypt that encrypted packet, endpoint 102(1) extracts, from the packet, the SPI value 210 (i.e., 0xd12477ad), the source IP address 202 (i.e., endpoint 102(7)'s public IP address (130.10.4.1)), the destination IP address 204 (i.e., endpoint 102(1)'s public IP address (10.15.33.254), and the source port number 206 (i.e., endpoint 102(7)'s port number (12323) at the CG-NAT function 108, and uses those four values to access its local SAD database to retrieve the appropriate SA needed to decrypt the packet. By including the extracted source port number 206, endpoint 102(1) will retrieve the appropriate SA from its local SAD database.

Without including the extracted source port number in its SA lookup, endpoint 102(1) could retrieve the wrong SA when decrypting the encrypted packet (for example, in the case where endpoint 102(1) generates two SAs with the same SPI in the Inbound SA table for endpoints 102(7) and 102(8), respectively). As a result, endpoint 102(1) might not be able to decrypt the encrypted packet received from endpoint 102(7). In the examples of FIGS. 3 and 4, the packets 200 arriving at endpoint 102(1) from PC 114(1) of FIG. 3 and the packets 200 arriving at endpoint 102(1) from PC 114(2) of FIG. 4 have the same source address 202 (i.e., 130.140.4.1), the same destination address 204 (i.e., 10.15.33.254), and the same SPI value (i.e., 0xd12477ad). As such, if SA lookups at endpoint 102(1) relied on only those three extracted values, then endpoint 102(1) might retrieve the wrong SA. Including the extracted source port number in SA lookups (e.g., (12323) for packets 200 arriving at endpoint 102(1) from PC 114(1) vs. (1036) for packets 200 arriving at endpoint 102(1) from PC 114(2)) avoids this problem.

Similarly, when generating an encrypted packet to transmit to endpoint 102(7), endpoint 102(1)'s routing algorithm first selects the IPsec tunnel, identifies the Outbound SA Index associated with that tunnel, and then performs a lookup using the index in the Outbound SA table to retrieve the appropriate SA needed to encrypt the packet.

Note that, when that encrypted packet traverses the CG-NAT function 108, (i) the packet's the destination address 204 will be translated from endpoint 102(7)'s public IP address (130.104.4.1) to endpoint 102(7)'s private IP address (192.0.28.10) and (ii) the packet's destination port number 208 will be translated from endpoint 102(7)'s port number (12323) at the CG-NAT function 108 to endpoint 102(7)'s port number (4500) at endpoint 102(7).

In order to decrypt that encrypted packet, endpoint 102(7) extracts, from the packet, the SPI value 210, the source address 202 (i.e., endpoint 102(1)'s public IP address (10.15.33.254)), the destination address 204 (i.e., endpoint 102(7)'s private IP address (192.0.28.10), and the source port number 206 (i.e., endpoint 102(1)'s port number (4500), and uses those four values to access its local SAD database to retrieve the appropriate SA needed to decrypt the packet. Note that, in this case, since endpoint 102(7)'s private IP address is unique within the private network 104, there is no risk of endpoint 102(7) retrieving the wrong SA from its local SAD database in the prior art. As such, using the extracted source port number is not needed. On the other hand, there is also no harm in including the extracted source port number in the SA lookup.

According to certain embodiments, a receiving endpoint 102 performs the following search algorithm during SA lookups for decrypting a received, encrypted packet:

(1) Search the SAD database for a match on {SPI, destination address, source address, source port}. If a SAD entry matches, then decrypt the encrypted packet with that matching SAD entry. Otherwise, proceed to step 2

(2) Search the SAD database for a match on {SPI, destination address, source address}. If an SAD entry matches, then decrypt the encrypted packet with that matching SAD entry. Otherwise, proceed to step 3.

(3) Search the SAD database for a match on {SPI, destination address}. If a SAD entry matches, then decrypt the encrypted packet with that matching SAD entry. Otherwise, proceed to step 4.

(4) Search the SAD database for a match on only {SPI}, if the receiver has chosen to maintain a single SPI space for AH and ESP, or on {SPI, protocol}, otherwise. If a SAD entry matches, then decrypt the encrypted packet with that matching SAD entry. Otherwise, discard the packet and log an auditable event.

FIG. 5 is a simplified hardware block diagram of an example endpoint 500 that can be used to implement any of the endpoints 102 of FIG. 1. As shown in FIG. 5, endpoint 500 includes (i) communication hardware (e.g., wireless, wireline, and/or optical transceivers (TRX)) 502 that supports communications with other nodes, (ii) one or more processors (e.g., CPU and/or GPU microprocessors) 504 that control the operations of endpoint 500 and/or process data within endpoint 500, and (iii) one or more memories (e.g., RAM, ROM) 506 that store code executed by the processors 504 and/or data generated and/or received by endpoint 500.

Although the disclosure has been described in the context of communications between one endpoint located behind a CG-NAT function (e.g., endpoint 102(7)) and another endpoint that is not located behind a CG-NAT function (e.g., endpoint (102(1)), those skilled in the art will understand that the disclosure can also be implemented in the context of communications between two different endpoints that are both located behind CG-NAT functions, including two different endpoints located behind the same CG-NAT functions, such as between endpoint 102(7) and any of endpoints 102(8)-102(9). Note that, since there is no harm in (i) including destination port numbers for SA lookups at transmitting endpoints and (ii) including source port numbers for SA lookups at receiving endpoints, all endpoints 102 in system 100 can use those values during those SA lookups whether they are needed or not.

Although the disclosure has been described in the context of communication systems that support CG-NAT functions, those skilled in the art will understand that the disclosure also applies to other possible types of communication systems where including the source port number in SA lookups avoids collisions between SAs having the same SPI value, source IP address, and destination IP address.

In certain embodiments, the present disclosure is a method for processing a packet. The method comprises identifying, for the packet, a plurality of values including a port number; using the plurality of values to retrieve a Security Association (SA) from an SA database (SAD); and processing the packet using the retrieved SA.

In at least some of the above embodiments, the destination IP address for the packet is a public address for a destination endpoint located behind a Carrier-Grade Network Address Translation (CG-NAT) function; and the destination port number for the packet is a port number for the destination endpoint located behind the CG-NAT function.

In at least some of the above embodiments, the CG-NAT function is associated with two or more different CG-NAT endpoints located behind the CG-NAT function, each CG-NAT endpoint having a different port number at the CG-NAT function.

In at least some of the above embodiments, the packet is an encrypted packet; the plurality of values includes a Security Parameter Index (SPI) value, a source address, a destination address, and a source port number for the packet; and the encrypted packet is processed at a destination endpoint using the retrieved SA to decrypt the encrypted packet.

In at least some of the above embodiments, the method further comprises extracting the SPI value, the source address, the destination address, and the source port number from the encrypted packet.

In at least some of the above embodiments, the source address for the packet is a public address for the source endpoint located behind a CG-NAT function; and the source port number for the packet is a port number for the source endpoint located behind the CG-NAT function.

In at least some of the above embodiments, the CG-NAT function is associated with two or more different CG-NAT endpoints located behind the CG-NAT function, each CG-NAT endpoint having a different port number at the CG-NAT function.

Unless explicitly stated otherwise, each numerical value and range should be interpreted as being approximate as if the word "about" or "approximately" preceded the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence. Likewise, additional steps may be included in such methods, and certain steps may be omitted or combined, in methods consistent with various embodiments of the disclosure.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

As used herein in reference to an element and a standard, the terms "compatible" and "conform" mean that the element communicates with other elements in a manner wholly or partially specified by the standard, and would be recognized by other elements as sufficiently capable of communicating with the other elements in the manner specified by the standard. A compatible or conforming element does not need to operate internally in a manner specified by the standard.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The functions of the various elements shown in the figures, including any functional blocks labeled as "processors" and/or "controllers," may be provided through the use of dedicated hardware as well as hardware capable of executing software in association with appropriate software. Upon being provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

As will be appreciated by one of ordinary skill in the art, the present disclosure may be embodied as an apparatus (including, for example, a system, a network, a machine, a device, a computer program product, and/or the like), as a method (including, for example, a business process, a computer-implemented process, and/or the like), or as any combination of the foregoing. Accordingly, embodiments of the present disclosure may take the form of an entirely software-based embodiment (including firmware, resident software, micro-code, and the like), an entirely hardware embodiment, or an embodiment combining software and hardware aspects that may generally be referred to herein as a "system" or "network".

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, upon the program code being loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, upon the program code being loaded into and executed by a machine, such as a computer, the machine becomes an apparatus for practicing the disclosure. Upon being implemented on a general-purpose processor, the program code segments combine with the processor to provide a unique device that operates analogously to specific logic circuits. The term "non-transitory," as used herein, is a limitation of the medium itself (i.e., tangible, not a signal) as opposed to a limitation on data storage persistency (e.g., RAM vs. ROM).

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements. For example, the phrases "at least one of A and B" and "at least one of A or B" are both to be interpreted to have the same meaning, encompassing the following three possibilities: 1—only A; 2—only B; 3—both A and B.

All documents mentioned herein are hereby incorporated by reference in their entirety or alternatively to provide the disclosure for which they were specifically relied upon.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

While preferred embodiments of the disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the technology of the disclosure. It is intended that the following claims define the scope of the invention and that methods and structures within the scope of these claims and their equivalents be covered thereby.

What is claimed is:

1. A method for processing an encrypted packet at a destination endpoint, the method comprising the destination endpoint:

identifying, for the encrypted packet, a plurality of values including a Security Parameter Index (SPI) value, a source address, a destination address, and a source port number;

using the SPI value, the source address, the destination address, and the source port number to retrieve a Security Association (SA) from an SA database (SAD); and decrypting the encrypted packet using the retrieved SA, wherein:

using the SPI value, the source address, the destination address, and the source port number to retrieve the SA from the SAD enables the destination endpoint to distinguish encrypted packets from different source Carrier-Grade Network Address Translation (CG-NAT) endpoints located behind a source CG-NAT function; and encrypted packets from the different source CG-NAT endpoints have the same SPI value, the same source address, the same destination address, and different source port numbers.

2. The method of claim 1, wherein:

a destination IP address for the encrypted packet is a public address for the destination endpoint located behind a destination CG-NAT function; and the destination port number for the packet is a port number for the destination endpoint located behind the destination CG-NAT function.

3. The method of claim 2, wherein the destination CG-NAT function is associated with two or more different destination CG-NAT endpoints located behind the destination CG-NAT function, each destination CG-NAT endpoint having a different port number at the destination CG-NAT function.

4. The method of claim 1, further comprising extracting the SPI value, the source address, the destination address, and the source port number from the encrypted packet.

5. The method of claim 1, wherein:

the source address for the encrypted packet is a public address for the source endpoint located behind the source CG-NAT function; and the source port number for the encrypted packet is a port number for the source endpoint located behind the source CG-NAT function.

6. The method of claim 5, wherein the source CG-NAT function is associated with two or more different source CG-NAT endpoints located behind the source CG-NAT function, each source CG-NAT endpoint having a different port number at the source CG-NAT function.

7. A destination endpoint comprising:

at least one processor; and at least one memory storing instructions that, upon being executed by the at least one processor, cause the destination endpoint at least to:

identify, for an encrypted packet, a plurality of values including a Security Parameter Index (SPI) value, a source address, a destination address, and a source port number;

use the SPI value, the source address, the destination address, and the source port number to retrieve an SA from a SAD database; and decrypt the encrypted packet using the retrieved SA, wherein:

using the SPI value, the source address, the destination address, and the source port number to retrieve the SA from the SAD enables the destination endpoint to distinguish encrypted packets from different source Carrier-Grade Network Address Translation (CG-NAT) endpoints located behind a source CG-NAT function; and encrypted packets from the different source CG-NAT endpoints have the same SPI value, the same source address, the same destination address, and different source port numbers.

8. The destination endpoint of claim 7, wherein:

a destination address for the encrypted packet is a public address for the destination endpoint located behind a destination CG-NAT function; and the destination port number for the packet is a port number for the destination endpoint located behind the destination CG-NAT function.

9. The destination endpoint of claim 8, wherein the destination CG-NAT function is associated with two or more different destination CG-NAT endpoints located behind the destination CG-NAT function, each destination CG-NAT endpoint having a different port number at the destination CG-NAT function.

10. The destination endpoint of claim 7, wherein the destination endpoint is adapted to extract the SPI value, the source address, the destination address, and the source port number from the encrypted packet.

11. The destination endpoint of claim 7, wherein:

the source address for the encrypted packet is a public address for the source endpoint located behind the source CG-NAT function; and the source port number for the encrypted packet is a port number for the source endpoint located behind the source CG-NAT function.

12. The destination endpoint of claim 11, wherein the source CG-NAT function is associated with two or more different source CG-NAT endpoints located behind the source CG-NAT function, each source CG-NAT endpoint having a different port number at the source CG-NAT function.

* * * * *